United States Patent
Yasui et al.

(10) Patent No.: US 8,542,430 B2
(45) Date of Patent: Sep. 24, 2013

(54) ELECTROPHORETIC DEVICE, DISPLAY UNIT, AND ELECTRONIC UNIT

(75) Inventors: Atsuhito Yasui, Kanagawa (JP); Hidehiko Takanashi, Kanagawa (JP); Ken Kobayashi, Kanagawa (JP); Ryo Kasegawa, Kanagawa (JP); Aya Shuto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/416,399

(22) Filed: Mar. 9, 2012

(65) Prior Publication Data
US 2012/0250138 A1    Oct. 4, 2012

(30) Foreign Application Priority Data

Mar. 28, 2011   (JP) .................................. 2011-070356

(51) Int. Cl.
*G02B 26/00*    (2006.01)
*G09G 3/34*     (2006.01)
*G03G 13/00*    (2006.01)

(52) U.S. Cl.
USPC .............................. 359/296; 345/107; 430/31

(58) Field of Classification Search
USPC ................. 359/296, 245, 253–254, 290–291, 359/298; 349/33; 345/49, 105, 107; 430/31–32
See application file for complete search history.

(56) References Cited

U.S. PATENT DOCUMENTS

| | | | |
|---|---|---|---|
| 3,892,568 A | 7/1975 | Ota | |
| 2001/0041339 A1* | 11/2001 | Anderson et al. | 435/6 |
| 2007/0196401 A1* | 8/2007 | Naruse et al. | 424/401 |
| 2008/0112040 A1* | 5/2008 | Suwabe et al. | 359/296 |
| 2008/0198443 A1* | 8/2008 | Yoshimura et al. | 359/296 |

FOREIGN PATENT DOCUMENTS

| | | |
|---|---|---|
| JP | 50-15115 | 6/1975 |
| JP | 50-15120 | 6/1975 |
| JP | 2551783 | 8/1996 |
| JP | 2002-244163 | 8/2002 |
| JP | 2003-526817 | 9/2003 |
| JP | 2004-536336 | 12/2004 |
| JP | 2005-107146 | 4/2005 |
| JP | 2005-128143 | 5/2005 |
| JP | 4188091 | 9/2008 |
| JP | 2009-509206 | 3/2009 |

* cited by examiner

*Primary Examiner* — Dawayne A Pinkney
(74) *Attorney, Agent, or Firm* — Rader, Fishman & Grauer PLLC

(57) ABSTRACT

An electrophoretic device includes: an electrophoretic particle; a porous layer formed of a fibrous structure containing a non-electrophoretic particle having optical reflection characteristics different from those of the electrophoretic particle; and a dividing wall adjacent to the porous layer. The electrophoretic particle, the porous layer, and the dividing wall are in an insulating liquid. Volume resistivity of the fibrous structure is larger than volume resistivity of the insulating liquid, and volume resistivity of the dividing wall is larger than the volume resistivity of the insulating liquid.

13 Claims, 9 Drawing Sheets

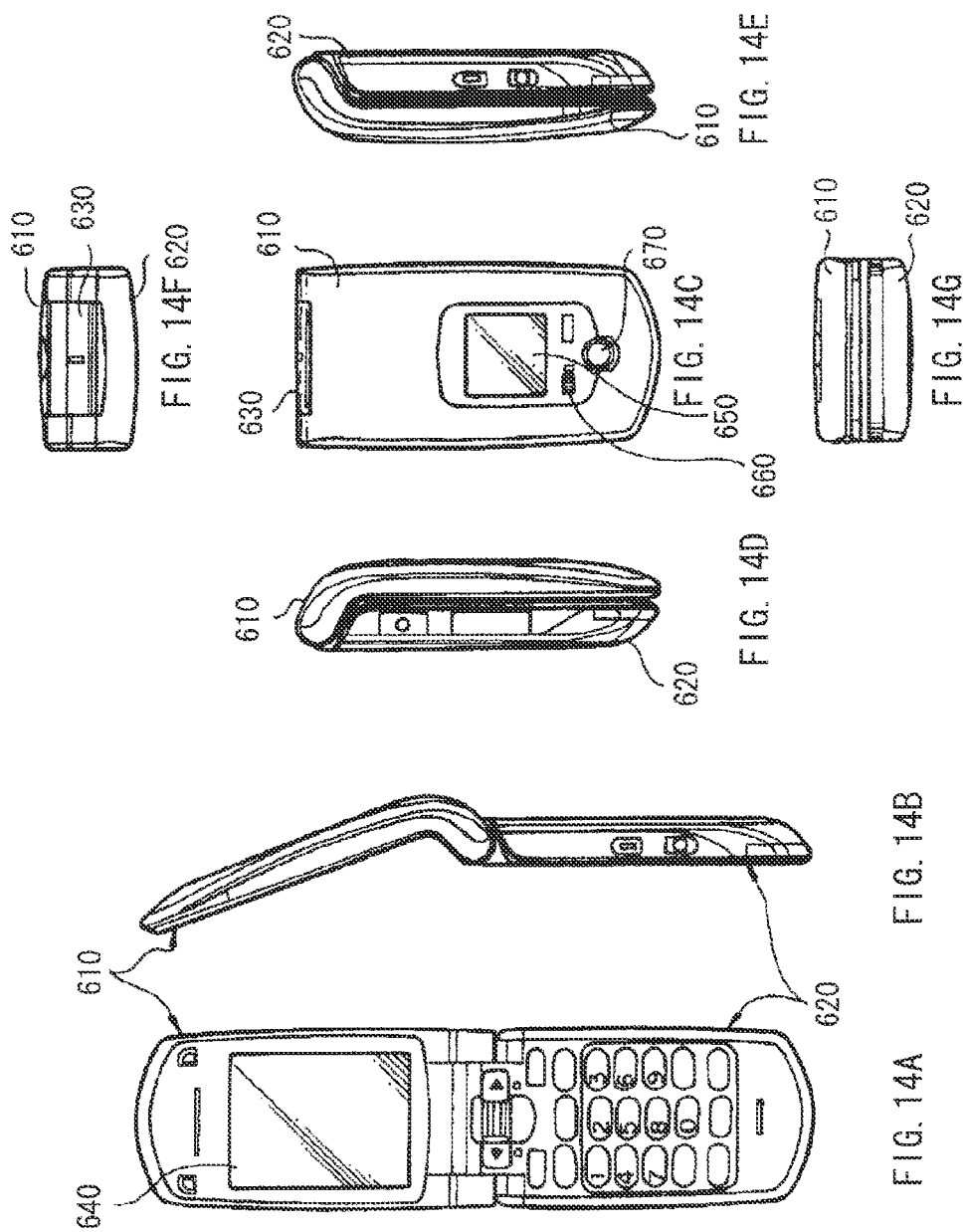

ELECTROPHORETIC DEVICE, DISPLAY UNIT, AND ELECTRONIC UNIT

BACKGROUND

The present technology relates to an electrophoretic device including an electrophoretic particle and a porous layer, a display unit using the electrophoretic device, and an electronic unit using the display unit.

Lately, as various electronic devices such as mobile phones and personal digital assistants (PDA) become widely used, display units (displays) with low power consumption and high image quality have been increasingly demanded. Specially, in recent years, in association with birth of delivery business of electronic books, electronic book terminals for the purpose of reading textual information for a long time have attracted attentions. Therefore, displays having display quality suitable for such a reading purpose have been aspired.

As the display for reading, cholesteric liquid crystal displays, electrophoretic displays, electrochromic displays, twist ball displays, and the like have been proposed. Specially, displays categorized as reflective type displays are preferable. Since the reflective type displays perform light display by using reflection (scattering) of outside light as paper does, the reflective type displays provide display quality close to that of paper. Further, in the reflective type displays, a backlight is not necessitated, and therefore power consumption is able to be kept low.

A major candidate of the reflective type displays is the electrophoretic display that generates lighting (contrast) by using electrophoretic phenomenon, since power consumption is low and high-speed response is superior in the electrophoretic display. Therefore, various discussions have been made for display methods of the electrophoretic display.

Specifically, a method of dispersing two types of charged particles each having different optical reflection characteristics and different polarity in an insulating liquid, and moving the respective charged particles with the use of a polarity difference has been proposed (for example, see Japanese Examined Patent Application Publication No. 50-015115 and Japanese Patent No. 4188091). In this method, since distribution of the two types of charged particles is changed according to electric field, contrast is generated by using difference of the optical reflection characteristics.

Further, a method of dispersing charged particles in an insulating liquid, arranging a porous layer having optical reflection characteristics different from those of the charged particles, and moving the charged particles through the porous layer has been proposed (for example, see Japanese Unexamined Patent Application Publication No. 2005-107146, Japanese Examined Patent Application Publication No. 50-015120, Japanese Unexamined Patent Application Publication No. 2005-128143, and Japanese Unexamined Patent Application Publication No. 2002-244163). As the porous layer, a polymer film in which fine pores are formed by a boring process by using a laser, a woven cloth made of synthesized fibers or the like, an open-cell porous polymer, and the like are used. In this method, since distribution of the charged particles is changed according to the electric field, contrast is generated by using a difference of the optical reflection characteristics.

In addition, a method of encapsulating charged particles in a microcapsule and a method of sectioning a range where charged particles are able to exist in parts by a dividing wall structure have been proposed (for example, see Japanese Patent No. 2551783 and Japanese Unexamined Patent Application Publication (Translation of PCT Application) No. 2003-526817). As a method of forming the dividing wall structure, an ultraviolet (UV) imprint method or the like has been proposed (for example, see Japanese Unexamined Patent Application Publication (Translation of PCT Application) No. 2004-536336 and Japanese Unexamined Patent Application Publication (Translation of PCT Application) No. 2009-509206). By these methods, aggregation, precipitation, convection, and the like of the charged particles are inhibited.

SUMMARY

Though various display methods of the electrophoretic display have been proposed, the display quality is not enough yet. In view of realizing color display, movie display, and the like in the future, it is necessary to further improve performance with regard to contrast and response speed. In this case, keeping the power consumption low is also important in order to use inherent advantages of the electrophoretic display.

It is desirable to provide an electrophoretic device, a display unit, and an electronic unit that are able to realize high contrast, high-speed response, and low power consumption.

According to an embodiment of the present technology, there is provided an electrophoretic device including: an electrophoretic particle; a porous layer formed of a fibrous structure containing a non-electrophoretic particle having optical reflection characteristics different from those of the electrophoretic particle; and a dividing wall adjacent to the porous layer. The electrophoretic particle, the porous layer, and the diving wall are in an insulating liquid. The volume resistivity of the fibrous structure is larger than the volume resistivity of the insulating liquid, and the volume resistivity of the dividing wall is larger than the volume resistivity of the insulating liquid.

According to an embodiment of the present technology, there is provided a display unit including the foregoing electrophoretic device of the embodiment of the present technology between a pair of base substances, at least one of which has light transmission characteristics, wherein the dividing wall is adjacent to an opposite surface of the porous layer from a display surface. Further, according to an embodiment of the present technology, there is provided an electronic unit including the foregoing display unit of the embodiment of the present technology.

"The optical reflection characteristics" mean what we call reflectance of light (outside light). The reason why the optical reflection characteristics of the non-electrophoretic particle are different from the optical reflection characteristics of the electrophoretic particle is that contrast is to be generated by using such characteristics difference. "The volume resistivity" is electric characteristics measured by an impedance method with the use of a dielectric measurement system (measured at certain intervals and at 10 deg C.). The dielectric measurement system is, for example, a 1260 type impedance analyzer including a 1296 type dielectric measurement interface made by Solartron, UK (Solartron SI 1260 impedance/grain-phase analyzer). "The display surface" means a surface on which an image is displayed in the display unit. In the electrophoretic device, the face on a side where the dividing wall is not adjacent to the porous layer corresponds to the display surface.

According to the electrophoretic device, the display unit, or an electronic unit according to the embodiments of the present disclosure, the electrophoretic particle, the porous layer (the fibrous structure containing the non-electrophoretic particle having optical reflection characteristics different from those of the electrophoretic particle), and the dividing wall are included in the insulating liquid. Further, the volume resistivity of the fibrous structure is larger than the volume resistivity of the insulating liquid, and the volume resistivity of the dividing wall is larger than the volume resistivity of the insulating liquid. Accordingly, high contrast, high-speed response, and low power consumption are able to be realized.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present technology, and are incorporated in and constitute a part of this specification. The drawings illustrate embodiments and, together with the specification, serve to explain the principles of the technology.

FIGS. 14A to 14G are plan views illustrating a configuration of a mobile phone using the display unit.

DETAILED DESCRIPTION OF THE PREFERRED EMBODIMENT

Embodiments of the present technology will be hereinafter described in detail with reference to the drawings. The description will be given in the following order:
1. Display Unit Using Electrophoretic Device
2. Method of Manufacturing Display Unit
3. Modifications
4. Application Examples of Display Unit (Electronic Units)
[1. Display Unit Using Electrophoretic Device]

Figure 1:
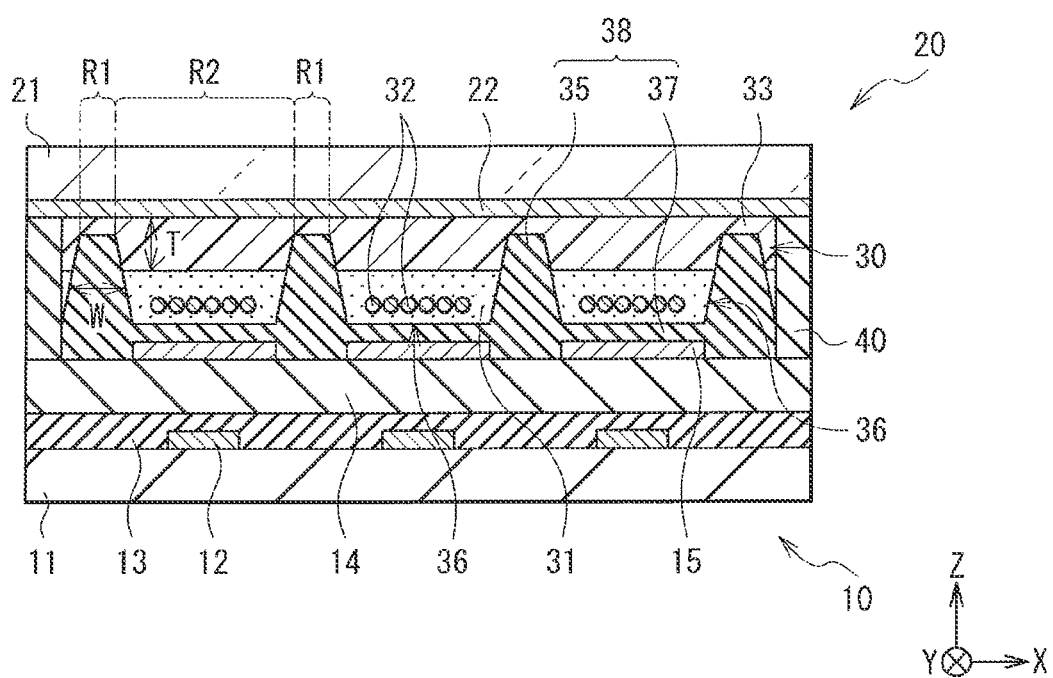
FIG. 1 is a cross-sectional view illustrating a configuration of a display unit using an electrophoretic device according to an embodiment of the present technology.
Figure 2:
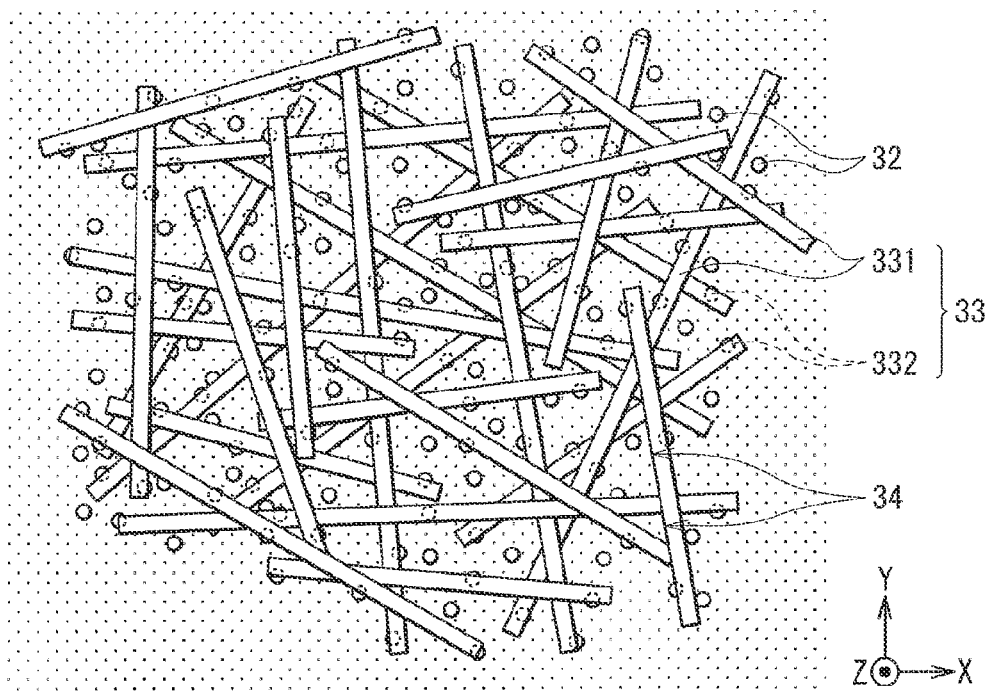
FIG. 2 is a plan view illustrating a configuration of a main section of the display unit.
Figure 3:
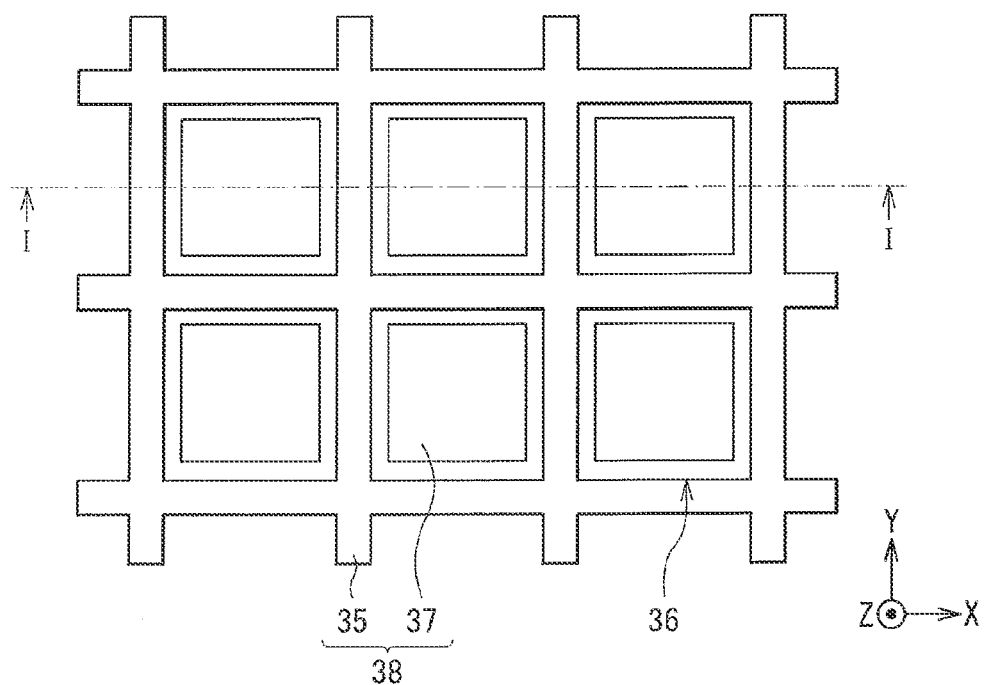
FIG. 3 is a plan view illustrating a configuration of another main section of the display unit.

First, a description will be given of a configuration of a display unit using an electrophoretic device according to an embodiment of the present technology. FIG. 1 illustrates a cross-sectional configuration of the display unit. FIG. 2 and FIG. 3 illustrate plane configurations of a main section of the display unit illustrated in FIG. 1. FIG. 1 illustrates a cross section taken along a line I-I indicated in FIG. 3.

The electrophoretic device according to the embodiment of the present technology is able to be applied to various purposes such as display units, and the purposes thereof are not particularly limited. A description will be hereinafter given of a case that the electrophoretic device is applied to the display unit. However, the configuration of the display unit is only an example, and is able to be changed as appropriate.
[Whole Configuration of Display Unit]

The display unit is an electrophoretic display for displaying an image (for example, textual information) by using electrophoretic phenomenon, and is what we call an electronic paper display. In the display unit, for example, as illustrated in FIG. 1, a drive substrate 10 and an opposed substrate (display panel) 20 are oppositely arranged with an electrophoretic device 30 and a spacer 40 in between. The display unit has a display surface on the opposed substrate 20 side. "To have a display surface on the opposed substrate 20 side" means that an image is displayed on the opposed substrate 20 side (users are able to view the image on the opposed substrate 20 side).
[Drive Substrate]

In the drive substrate 10, for example, a thin film transistor (TFT) 12, a protective layer 13, a planarizing insulating layer 14, and a pixel electrode 15 are formed in this order over one surface of a support base substance 11. The TFT 12 and the pixel electrode 15 are arranged or formed separately in a state of matrix or in a state of segment according to, for example, a pixel pattern or the like.

The support base substance 11 is formed of, for example, an inorganic material, a metal material, a plastic material, or the like. Examples of the inorganic material include silicon (Si), silicon oxide ($SiO_x$), silicon nitride ($SiN_x$), and aluminum oxide ($AlO_x$). Examples of the silicon oxide include glass and spin-on glass (SOG). Examples of the metal material include aluminum (Al), nickel (Ni), and stainless steel. Examples of the plastic material include polycarbonate (PC), polyethylene terephthalate (PET), polyethylene naphthalate (PEN), and polyethyl ether ketone (PEEK).

The support base substance 11 may be of a light transmissive type or a non-light transmissive type. Since an image is displayed on the opposed substrate 20 side, the support base substance 11 is not necessarily of a light transmissive type. Further, the support base substance 11 can be a substrate having rigidity such as a wafer, or can be a thin layer glass, a film, or the like having flexibility. Specially, the latter type is preferable, since thereby a flexible (bendable) display unit is able to be realized.

The TFT 12 is a switching-use device for selecting a pixel. The TFT 12 may be an inorganic TFT using an inorganic semiconductor layer as a channel layer, or may be an organic TFT using an organic semiconductor layer. The protective layer 13 and the planarizing insulating layer 14 are formed of, for example, an insulating material such as polyimide. However, as long as the surface of the protective layer 13 is sufficiently flat, the planarizing insulating layer 14 may be omitted. The pixel electrode 15 is formed of, for example, a conductive material such as gold (Au), silver (Ag), copper (Cu), aluminum (Al), an aluminum alloy, and indium oxide-tin oxide (ITO). The pixel electrode 15 is connected to the TFT 12 through a contact hole (not illustrated) provided in the protective layer 13 and the planarizing insulating layer 14.

FIG. 1 illustrates, for example, a case that the TFT 12 is arranged for every cell 36 described later (one TFT 12 is provided for one cell 36). However, a configuration thereof is not necessarily limited thereto, and the respective numbers of the cells 36 and the TFTs 12 and position relation thereof may be freely set. For example, two TFTs 12 may be arranged for three cells 36, or a border line between two adjacent TFTs 12 may be located within a region of the cell 36.

[Opposed Substrate]

In the opposed substrate 20, for example, a counter electrode 22 is formed entirely to cover one surface of a support base substance 21. Otherwise, the counter electrode 22 may be formed in a state of matrix or in a state of segment as the pixel electrode 15 may be.

The support base substance 21 is formed of a similar material to that of the support base substance 11, except that the support base substance 21 is of a light transmissive type. Since an image is displayed on the opposed substrate 20 side, the support base substance 21 should be of a light transmissive type. The counter electrode 22 is formed of, for example, a light transmissive conductive material (transparent electrode material) such as indium oxide-tin oxide (ITO), antimony oxide-tin oxide (ATO), fluorine-doped tin oxide (FTO), and aluminum-doped zinc oxide (AZO).

In the case where an image is displayed on the opposed substrate 20 side, viewers view the display unit (electrophoretic device 30) through the counter electrode 22. Therefore, light transmission characteristics (light transmittance) of the counter electrode 22 are preferably high as much as possible, and are, for example, equal to or higher than 80%. Further, electric resistance of the counter electrode 22 is preferably low as much as possible, and for example, is equal to or smaller than 100 Ω/□.

[Electrophoretic Device]

As illustrated in FIG. 1 and FIG. 2, the electrophoretic device 30 includes an electrophoretic particle 32 and a porous layer 33 in an insulating liquid 31. The electrophoretic particle 32 is dispersed in the insulating liquid 31. The porous layer 33 has a plurality of fine pores 34. One or more dividing walls 35 are adjacent to an opposite surface of the porous layer 33 from the display surface. In FIG. 1, the fine pores 34 are not illustrated.

[Insulating Liquid]

The insulating liquid 31 occupies, for example, a space surrounded by the drive substrate 10, the opposed substrate 20, and the spacer 40.

The insulating liquid 31 is, for example, one or more of non-aqueous solvents such as an organic solvent, and is specifically paraffin, isoparaffin, or the like. Viscosity and refractive index of the insulating liquid 31 are preferably small as much as possible, since thereby mobility (response speed) of the electrophoretic particle 32 is improved, and accordingly energy (power consumption) necessary to move the electrophoretic particle 32 is decreased. Further, since a difference between the refractive index of the insulating liquid 31 and refractive index of the porous layer 33 is increased, light reflectance of the porous layer 33 is increased as well.

The insulating liquid 31 may contain other various materials as needed. Examples of the various materials include a colorant, a charge control agent, a dispersion stabilizer, a viscosity modifier, an interfacial active agent, and a resin.

[Electrophoretic Particles]

The electrophoretic particle 32 is one or more charged particles (electrophoretic particles) that are electrophoresed, and are able to be moved in the insulating liquid 31 toward the pixel electrode 15 or the counter electrode 22 according to an electric field. The electrophoretic particle 32 is, for example, particles (powder) formed of, for example, one or more materials of an organic pigment, an inorganic pigment, a dye, a carbon material, a metal material, a metal oxide, glass, and a polymer material (resin). Further, the electrophoretic particle 32 can be a crushed particle, a capsule particle, or the like of a resin solid content containing the foregoing particle. Materials corresponding to the carbon material, the metal material, the metal oxide, the glass, or the polymer material are excluded from materials corresponding to the organic pigment, the inorganic pigment, or the dye.

Examples of the organic pigment include an azo pigment, a metal complex azo pigment, a poly-condensed azo pigment, a flavanthrone pigment, a benzimidazolone pigment, a phthalocyanine pigment, a quinacridone pigment, an anthraquinone pigment, a perylene pigment, a perinone pigment, an anthrapyridine pigment, a piranthrone pigment, a dioxazine pigment, a thioindigo pigment, an isoindolinone pigment, a quinophthalone pigment, and an indanthrene pigment. Examples of the inorganic pigment include zinc oxide, antimony trioxide, carbon black, iron black, titanium boride, colcothar, mapico yellow, minium, cadmium yellow, zinc sulfide, lithopone, barium sulfide, cadmium selenide, calcium carbonate, barium sulfate, lead chromate, lead sulfate, barium carbonate, white lead, and alumina white. Examples of the dye include a nigrosine dye, an azo dye, a phthalocyanine dye, a quinophthalone dye, an anthraquinone dye, and a methine dye. Examples of the carbon material include carbon black. Examples of the metal material include gold, silver, and copper. Examples of the metal oxide include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material include a polymer compound in which a functional group having a light absorption region in a visible light region is introduced. As long as a polymer compound having the light absorption region in the visible light region is used, the type thereof is not particularly limited. The foregoing materials may be used singly, or two or more thereof may be used as a mixture.

The content (concentration) of the electrophoretic particle 32 in the insulating liquid 31 is not particularly limited, and is, for example, from 0.1 wt % to 10 wt % both inclusive, since thereby shielding (concealing) characteristics and mobility of the electrophoretic particle 32 are secured. In this case, if the content (concentration) of the electrophoretic particle 32 in the insulating liquid 31 is smaller than 0.1 wt %, the electrophoretic particle 32 may be less likely to shield the porous layer 33. Meanwhile, if the content (concentration) of the electrophoretic particle 32 in the insulating liquid 31 is larger than 10 wt %, dispersibility of the electrophoretic particle 32 is lowered, and therefore, the electrophoretic particle 32 may be less likely to be electrophoresed, and may be aggregated in some cases.

The electrophoretic particle 32 has given optical reflection characteristics (light reflectance). Though the light reflectance of the electrophoretic particle 32 is not particularly limited, the light reflectance of the electrophoretic particle 32 is preferably set to, at least, a value at which the electrophoretic particle 32 is able to shield the porous layer 33 for the following reason. That is, by using a difference between the light reflectance of the electrophoretic particle 32 and the light reflectance of the porous layer 33, contrast is generated.

Specific formation materials of the electrophoretic particle 32 are selected according to a role undertaken by the electrophoretic particle 32 to generate contrast, for example. Specifically, a material in the case of performing light display by the electrophoretic particle 32 is, for example, a metal oxide such as titanium oxide, zinc oxide, zirconium oxide, barium titanate, and potassium titanate. Specially, titanium oxide is preferable, since titanium oxide has superior electrochemical stability and superior dispersibility, and provides high reflectance. Meanwhile, a material in the case of performing dark display by the electrophoretic particle 32 is, for example, a carbon material, a metal oxide, or the like. Examples of the carbon material include carbon black. Examples of the metal oxide include copper-chromium oxide, copper-manganese oxide, copper-iron-manganese oxide, copper-chromium-manganese oxide, and copper-iron-chromium oxide. Specially, the carbon material is preferable, since thereby superior chemical stability, superior mobility, and superior light absorbability are able to be obtained. The foregoing materials may be used singly, or two or more thereof may be used as a mixture.

In the case of performing the light display by the electrophoretic particle 32, a color of the electrophoretic particle 32 viewed from outside is not particularly limited as long as contrast is able to be thereby generated. However, specially, the color of the electrophoretic particle 32 viewed from the outside is preferably a color close to white, and is more preferably white. Meanwhile, in the case of performing the dark display by the electrophoretic particle 32, the color of the electrophoretic particle 32 viewed from the outside is not particularly limited as long as contrast is able to be thereby generated. However, specially, the color of the electrophoretic particle 32 viewed from the outside is preferably a color close to black, and is more preferably black. In both cases, high contrast is able to be obtained.

It is preferable that the electrophoretic particle 32 be easily dispersed and be easily charged in the insulating liquid 31 for a long time, and be less likely to be absorbed into the porous layer 33. Therefore, a disperser (or a charge adjuster) may be used in order to disperse the electrophoretic particle 32 by electrostatic repulsion, the electrophoretic particle 32 may be provided with surface treatment, or both the foregoing methods may be used.

Examples of the disperser include Solsperse series made by Lubrizol Co., BYK series or Anti-Terra series made by BYK-Chemie Co., and Span series made by ICI Americas Co.

Examples of the surface treatment include rosin treatment, surfactant treatment, pigment derivative treatment, coupling agent treatment, graft polymerization treatment, and microcapsulation treatment. Specially, the graft polymerization treatment, the microcapsulation treatment, or a combination thereof is preferable, since thereby dispersion stability and the like are able to be obtained for a long time.

Examples of a material for the surface treatment include a material (absorptive material) having a functional group capable of being absorbed into the surface of the electrophoretic particle 32 (absorbable functional group) and a polymerizable functional group. Absorbable functional group type is determined according to the formation material of the electrophoretic particle 32. Examples thereof include an aniline derivative such as 4-vinylaniline for a carbon material such as carbon black and an organosilane derivative such as methacrylic acid 3-(trimethoxysilyl)propyl for a metal oxide. Examples of the polymerizable functional group include a vinyl group, an acryl group, and a methacryl group.

Further, examples of a material for the surface treatment include a material capable of being grafted into the surface of the electrophoretic particle 32 to which a polymerizable functional group is introduced (graft material). The graft material preferably has a polymerizable functional group and a dispersion functional group capable of dispersing the electrophoretic particle 32 in the insulating liquid 31 and capable of retaining dispersibility by steric barrier. Polymerizable functional type is similar to that described for the absorptive material. Examples of the dispersion functional group include a branch-like alkyl group in the case where the insulating liquid 31 is paraffin. To polymerize or graft the graft material, for example, a polymerization initiator such as azobisisobutyronitrile (AIBN) may be used.

For reference, for details of the method of dispersing the electrophoretic particle 32 in the insulating liquid 31 as described above, descriptions are given in books such as "Dispersion Technology of Superfine Particle and Evaluation thereof: Surface Treatment, Pulverizing, and Dispersion Stabilization in Air/Liquid/Polymer" published by Science & Technology Co.

[Porous Layer]

As illustrated in FIG. 2, the porous layer 33 is a three-dimensional space structure (irregular network structure such as a non-woven cloth) formed of a fibrous structure 331, and may be supported by the spacer 40. The porous layer 33 has one or more gaps (fine pores 34) through which the electrophoretic particle 32 is moved in a location where the fibrous structure 331 does not exist. The fine pores 34 are filled with the insulating liquid 31. Therefore, the electrophoretic particle 32 is able to be moved through the insulating liquid 31 filled with the fine pores 34. The porous layer 33 may be adjacent to the counter electrode 22, or may be separated therefrom.

The fibrous structure 331 contains one or more non-electrophoretic particles 332. The non-electrophoretic particle 332 is supported by the fibrous structure 331. In the porous layer 33 as the three-dimensional space structure, one fibrous structure 331 may intertwine at random, a plurality of fibrous structures 331 may assemble and be layered at random, or both the foregoing states may exist at once. In the case where a plurality of fibrous structures 331 exist, the respective fibrous structures 331 preferably support one or more non-electrophoretic particles 332. FIG. 2 illustrates a case that the porous layer 33 is formed of a plurality of fibrous structures 331.

The porous layer 33 is the three-dimensional space structure formed of the fibrous structure 331 for the following reason. Due to the irregular space structure, the outside light is easily reflected diffusely (multiple scattering). Therefore, the light reflectance of the porous layer 33 is significantly increased, and such high light reflectance leads to the thin porous layer 33. Accordingly, contrast is increased, and energy necessary to move the electrophoretic particle 32 is decreased. Further, since the average pore diameter of the fine pore 34 is increased, and the number thereof is increased, the electrophoretic particle 32 easily moves through the fine pore 34. Thereby, time necessary to move the electrophoretic particle 32 is decreased, and energy necessary to move the electrophoretic particle 32 is more decreased.

The fibrous structure 331 contains the non-electrophoretic particle 332 for the following reason. That is, since the outside light is more easily reflected diffusely, the light reflectance of the porous layer 33 is more increased. Thereby, contrast is more increased.

The fibrous structure 331 is a fibrous material having a sufficiently large length with respect to the fiber diameter (diameter). The fibrous structure 331 is, for example, formed of one or more of a polymer material, an inorganic material, and the like, and may be formed of other materials. Examples of the polymer material include nylon, polyactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrrolidone, polyvinylidene fluoride, polyhexafluoropropylene, acetylcellulose, collagen, gelatin, chitosan, and copolymers thereof. Examples of the inorganic material include titanium oxide. Specially, as a formation material of the fibrous structure 331, the polymer material is preferable. Since the polymer material has low reactivity (photoreactivity or the like) (that is, is chemically stable), unintended decomposition reaction of the fibrous structure 331 is thereby inhibited. In the case where the fibrous structure 331 is formed of a material with high reactivity, the surface of the fibrous structure 331 is preferably covered with a given protective layer.

The shape (appearance) of the fibrous structure 331 is not particularly limited as long as the fibrous structure 331 is a fiber having a sufficiently large length with respect to the fiber diameter as described above. Specifically, the shape (appearance) of the fibrous structure 331 can be linear, can be curly, or can be bent on the way. Further, the fibrous structure 331 is not necessarily extended in one direction, and can be branched in one or more directions on the way. A method of forming the fibrous structure 331 is not particularly limited. The method of forming the fibrous structure 331 is preferably, for example, one or more of a phase separation method, a phase reverse method, an electrostatic (electric field) spinning method, a melt spinning method, a wet spinning method, a dry spinning method, a gel spinning method, a sol gel method, a spray coating method, or the like, since a fiber material having a sufficiently large length with respect to the fiber diameter is easily and stably formed by the foregoing methods.

Though the average fiber diameter of the fibrous structure 331 is not particularly limited, the average fiber diameter of the fibrous structure 331 is preferably small as much as possible for the following reason. That is, light becomes easily reflected diffusely, and the average pore diameter of the fine pore 34 becomes larger. However, it may be necessary to determine the average fiber diameter so that the fibrous structure 331 is able to support the non-electrophoretic particle 332. Therefore, the average fiber diameter of the fibrous structure 331 is preferably equal to or smaller than 10 nm. The lower limit of the average fiber diameter is not particularly limited, and may be, for example, equal to or smaller than 0.1 nm. The average fiber diameter is measured by microscope observation with the use of a scanning electron microscope (SEM) or the like. The average length of the fibrous structure 331 may be appropriately set.

The average pore diameter of the fine pore 34 is not particularly limited. Specially, the average pore diameter of the fine pore 34 is preferably large as much as possible, since thereby the electrophoretic particle 32 easily moves through the fine pore 34. Therefore, the average pore diameter of the fine pore 34 is preferably from 0.1 nm to 10 nm both inclusive.

Thickness of the porous layer 33 is not particularly limited, and is, for example, from 5 nm to 100 nm both inclusive, since thereby shielding characteristics of the porous layer 33 are increased, and the electrophoretic particle 32 easily moves through the fine pore 34. The thickness of the porous layer 33 herein defined means thickness of the porous layer 33 in an after-mentioned non-adjacent region R2.

In particular, the fibrous structure 331 is preferably a nanofiber. In the case where the nanofiber is used as the fibrous structure 331, the space structure becomes complicated and the outside light is easily reflected diffusely, and therefore the light reflectance of the porous layer 33 is more increased. In addition, in the case where the nanofiber is used as the fibrous structure 331, volume ratio of the fine pore 34 per unit volume of the porous layer 33 is increased, and therefore the electrophoretic particle 32 easily moves through the fine pore 34. Thereby, contrast is more increased, and the energy necessary to move the electrophoretic particle 32 is more decreased. The nanofiber is a fibrous material having a fiber diameter being from 0.001 nm to 0.1 nm both inclusive and having a length being 100 times or more the fiber diameter. The fibrous structure 331 as the nanofiber is preferably formed by electrostatic spinning method with the use of a polymer material, since thereby the fibrous structure 331 having a small fiber diameter is easily and stably formed.

The fibrous structure 331 preferably has optical reflection characteristics different from those of the electrophoretic particle 32. Specifically, though light reflectance of the fibrous structure 331 is not particularly limited, the light reflectance of the fibrous structure 331 is preferably set, at least, so that the porous layer 33 is able to shield the electrophoretic particle 32 as a whole for the following reason. That is, by using the difference between the light reflectance of the electrophoretic particle 32 and the light reflectance of the porous layer 33, contrast is able to be generated. Accordingly, the fibrous structure 331 having light transparency (transparent and colorless characteristics) in the insulating liquid 31 is not preferable. However, in the case where the light reflectance of the fibrous structure 331 is less likely to affect the light reflectance of the entire porous layer 33, and the light reflectance of the entire porous layer 33 is practically determined by the light reflectance of the non-electrophoretic particles 332, the light reflectance of the fibrous structure 331 may be appropriately set.

The non-electrophoretic particle 332 is fixed to the fibrous structure 331, and is a particle that is not electrophoresed. A formation material of the non-electrophoretic particle 332 is, for example, similar to the formation material of the electrophoretic particle 32, and is selected according to a role undertaken by the non-electrophoretic particle 332 as described later.

The non-electrophoretic particle 332 may be partially exposed from the fibrous structure 331, or may be buried inside thereof, as long as the non-electrophoretic particle 332 is supported by the fibrous structure 331.

The non-electrophoretic particle 332 has optical reflection characteristics different from those of the electrophoretic particle 32. Though light reflectance of the non-electrophoretic particle 332 is not particularly limited, the light reflectance of the non-electrophoretic particle 332 is preferably set, at least, so that the porous layer 33 is able to shield the electrophoretic particle 32 as a whole for the following reason. That is, by using the difference between the light reflectance of the electrophoretic particle 32 and the light reflectance of the porous layer 33, contrast is able to be generated.

A specific formation material of the non-electrophoretic particle 332 is selected, for example, according to a role undertaken by the non-electrophoretic particle 332 for generating contrast. Specifically, a material in the case of performing the light display by the non-electrophoretic particle 332 is similar to the material of the electrophoretic particle 32 selected in the case of performing the light display by the electrophoretic particle 32. Meanwhile, a material in the case of performing the dark display by the non-electrophoretic particle 332 is similar to the material of the electrophoretic particle 32 selected in the case of performing the dark display by the electrophoretic particle 32. Specially, as the material selected in the case of performing the light display by the non-electrophoretic particle 332, a metal oxide is preferable, and titanium oxide is more preferable, since thereby superior electrochemical stability, superior fixing characteristics, and high reflectance are able to be obtained. The formation material of the non-electrophoretic particle 332 may be the same type as that of the formation material of the electrophoretic particle 32, or may be different type from that of the formation material of the electrophoretic particle 32, as long as contrast is able to be thereby generated.

A color viewed in the case of performing the light display or the dark display by the non-electrophoretic particle 332 is similar to the case described for the viewed color of the electrophoretic particle 32.

As described above, the dividing wall 35 is adjacent to the opposite surface of the porous layer 33 from the display surface. Thereby, as illustrated in FIG. 1, the existence region of the porous layer 33 is categorized into a region where the dividing wall 35 is adjacent to the porous layer 33 (adjacent region R1) and a region where the dividing wall 35 is not adjacent to the porous layer 33 (non-adjacent region R2).

The area ratio of the fine pore 34 per unit area of the porous layer 33 (hereinafter referred to as "area occupation ratio of the fine pore 34") is preferably smaller in the adjacent region R1 than in the non-adjacent region R2 for the following reason. That is, for example, the porous layer 33 is firstly formed so that the area occupation ratio of the fine pore 34 becomes almost uniform, and subsequently part of the porous layer 33 is pressed. The thickness T of the porous layer 33 may be smaller in the adjacent region R1 than in the non-adjacent region R2.

The area occupation ratio of the fine pore 34 is expressed by area occupation ratio (%)=(area of the fine pore 34/area of the porous layer 33)*100 based on the area of the porous layer 33 and the area of the fine pore 34 existing therein. For examining the area occupation ratio, for example, after the porous layer 33 is provided with section process by, for example, a cryotome or the like, a cross section of the porous layer 33 is observed by a metal microscope, a confocal microscope, a scanning electron microscope, or the like. Differentiating the fibrous structure 331 (including the non-electrophoretic particle 332) and the fine pore 34 (defining the borderline between the fibrous structure 331 and the fine pore 34) may be made visually, or may be made by using image processing software for identifying an image with the use of a difference of contrast or the like. Similarly, calculating an area may be made by using calculation software or the like.

In this case, though the area occupation ratio is used for determining a difference between the occupation ratio of the fine pore 34 in the adjacent region R1 and that in the non-adjacent region R2, a volume occupation ratio may be used instead thereof. In the case of using the volume occupation ratio, the difference in the occupation ratio of the fine pore 34 is able to be determined as in the case of using the area occupation ratio.

The dividing wall 35 is adjacent to the opposite surface of the porous layer 33 from the display surface for the following reason. That is, in this case, contrast lowering caused by existence of the dividing wall 35 is inhibited. More specifically, in the case where the dividing wall 35 is formed of a light transmissive material such as a resin, in each cell 36, contrast is easily lowered resulting from light leaked from an adjacent cell 36 through the dividing wall 35 (visible light). Regarding such a disadvantage, in the case where the porous layer 33 that is less likely to transmit light (the area occupation ratio of the fine pore 34 is small) exists in front of the dividing wall 35 (on the display surface side), contrast lowering resulting from light leaked from the adjacent cell 36 is inhibited. Therefore, contrast is less likely to be lowered resulting from the existence of the dividing wall 35. Another factor of contrast lowering may be light generated from the drive substrate 10 in addition to the light leaked from the adjacent cell 36.

The area occupation ratio of the fine pore 34 is smaller in the adjacent region R1 than in the non-adjacent region R2 for the following reason. That is, in this case, the dividing wall 35 is easily shielded by the porous layer 33 in the adjacent region R1 more than in the case that the area occupation ratio of the fine pore 34 is larger in the adjacent region R1 than in the non-adjacent region R2. Further, in the adjacent region R1, size and the number of the fine pore 34 are decreased as the area occupation ratio of the fine pore 34 is decreased. Therefore, the electrophoretic particle 32 is less likely to be moved to the adjacent cell 36 through the fine pore 34.

The thickness T of the porous layer 33 is smaller in the adjacent region R1 than in the non-adjacent region R2 for the following reason. That is, as described above, the porous layer 33 is pressed in the adjacent region R1 so that the dividing wall 35 is easily shielded by the porous layer 33 and the electrophoretic particle 32 is less likely to be moved into the adjacent region R1. Further, in the case where the thickness T of the porous layer 33 is not smaller in the adjacent region R1 than in the non-adjacent region R2 (in the case where the porous layer 33 is not pressed in the adjacent region R1), the thickness of the entire electrophoretic device 30 is decreased, and therefore the thickness of the electrophoretic device 30 is decreased.

An example of a formation procedure of the porous layer 33 is as follows. First, a formation material of the fibrous structure 331 (for example, a polymer material or the like) is dispersed or dissolved in an organic solvent or the like to prepare a spinning solution. Subsequently, after the non-electrophoretic particle 332 is added to the spinning solution, the resultant is sufficiently stirred to disperse the non-electrophoretic particle 332 in the spinning solution. Subsequently, spinning is performed by an electrostatic spinning method with the use of the spinning solution. Thereby, since the non-electrophoretic particle 332 is supported by the fibrous structure 331, the porous layer 33 with the almost uniform area occupation ratio of the fine pore 34 is formed. Finally, part of the porous layer 33 is pressed to decrease the area occupation ratio of the fine pore 34 in the pressed section. As a member for pressing the porous layer 33, the dividing wall 35 to be finally adjacent to the porous layer 33 may be used, or a member other than the dividing wall 35 may be used. Such a member may be anything as long as the member is able to press the porous layer 33. Thereby, in the porous layer 33, a region where the area occupation ratio of the fine pore 34 is decreased and a region where the area occupation ratio of the fine pore 34 is not decreased are formed. By finally making the dividing wall 35 adjacent to the porous layer 33, the former region becomes the adjacent region R1, and the latter region becomes the non-adjacent region R2.

[Dividing Wall]

The dividing wall 35 is intended to section a region where the electrophoretic particle 32 dispersed in the insulating liquid 31 is able to exist and to form a space (after-mentioned cell 36) to contain the electrophoretic particle 32. The dividing wall 35 is extended toward the porous layer 33, and is adjacent to part of the opposite surface of the porous layer 33 from the display surface.

As illustrated in FIG. 1 and FIG. 3, one or more spaces (cell 36) for containing the electrophoretic particle 32 are formed by the dividing wall 35. The number and arrangement pattern of the cell 36 are not particularly limited. However, to efficiently arrange the plurality of cells 36, the cells 36 are preferably arranged in a matrix state (arrangement of a plurality of rows*a plurality of lines). Further, the shape of the cell 36 (aperture shape) is not particularly limited, may be a rectangle as illustrated in FIG. 3, and may be another shape (hexagonal shape or the like).

For example, the dividing wall 35 may be provided on one surface of a support base substance 37 and may be supported by the support base substance 37. In this case, the dividing wall 35 and the support base substance 37 may be unitized (dividing wall unit 38). However, the dividing wall 35 and the support base substance 37 may be integrated or may be separately provided. In the latter case, the support base substance 37 can be made of a film or the like. In this case, the dividing wall unit 38 is formed to cover the pixel electrode 15 and the planarizing insulating layer 14 at the periphery thereof.

A formation material of the dividing wall 35 are not particularly limited as long as the material does not affect operation performance and the like of the electrophoretic device 30, and are preferably a resin suitable for molding process since thereby the dividing wall 35 having desired dimensions and a desired shape is easily formed. The resin is, for example, a thermoplastic resin, a light cured resin, or the like (including a resist for photolithography), or may be other resin. The same is applied to a formation material of the support base substance 37.

In the case where the resin is used as the formation material of the dividing wall 35, the dividing wall 35 is formed by, for example, a thermal imprint method using a thermoplastic resin, an optical imprint method using a light cured resin, or the like. Specifically, in the thermal imprint method, for example, a mold (female die) is pressed against a resin (polymer material) heated up to temperature equal to or higher than glass transition temperature, and subsequently the mold is exfoliated from the resin after cooling. Thereby, the mold shape is transferred to the resin surface, and thereby the dividing wall unit 38 having a desired shape is formed. The mold may be a photoresist film formed by a photolithography method, or may be a metal plate or the like formed by a machine process using a turning tool.

Width W of the dividing wall 35 may be uniform or non-uniform in the extension direction. Specially, the width W is preferably decreased gradually toward the porous layer 33 for the following reason. That is, in this case, the aperture area of the cell 36 is increased toward the display surface side, and accordingly the immovable region of the electrophoretic particle 32 (adjacent region R1) is narrowed, and therefore the image display area is widened. A gradient angle (what we call a taper angle) of a side face of the dividing wall 35 is not particularly limited, and is, for example, from 60 to 90 deg both inclusive, and is preferably from 75 to 85 deg both inclusive.

A pitch, a height, and the like of the dividing wall 35 are not particularly limited, and are able to be freely set. As an example, the pitch of the dividing wall 35 is from 30 nm to 300 nm both inclusive, and is preferably from 60 nm to 150 nm both inclusive. The height of the dividing wall 35 is from 10 nm to 100 nm both inclusive, and is preferably from 30 nm to 50 nm both inclusive.

Specially, the height of the dividing wall 35 and the thickness T of the porous layer 33 in the adjacent region R1 are preferably substantially uniform for the following reason. In the case, distance between the pixel electrode 15 and the counter electrode 22 (what we call a gap) becomes constant, and accordingly the electric field intensity is uniformalized. Thereby, unevenness of the response speed or the like is improved.

[Volume Resistivity]

In the electrophoretic device 30, magnitude relations of volume resistivity between each component element are made appropriate. Specifically, volume resistivity of the fibrous structure 331 composing the porous layer 33 is larger than the volume resistivity of the insulating liquid 31. Further, volume resistivity of the dividing wall 35 is larger than the volume resistivity of the insulating liquid 31. As long as the foregoing magnitude relations are satisfied, an absolute value of the volume resistivity of each of the fibrous structure 331, the insulating liquid 31, and the dividing wall 35 is able to be freely set.

The volume resistivity of the fibrous structure 331 is larger than the volume resistivity of the insulating liquid 31 for the following reason. That is, in the case where a voltage is applied between the pixel electrode 15 and the counter electrode 22, the voltage is more easily applied to the insulating liquid 31 than to the fibrous structure 331, and therefore, a voltage drop is more largely generated in the fibrous structure 331. Thereby, application efficiency of the voltage to the electrophoretic particle 32 dispersed in the insulating liquid 31 is improved, and the electrophoretic particle 32 is easily moved through the insulating liquid 31.

Further, the volume resistivity of the dividing wall 35 is larger than the volume resistivity of the insulating liquid 31 for the following reason. In this case, in applying a voltage, a current more easily flows to the insulating liquid 31 than to the dividing wall 35. That is, the regions R1 and R2 are in parallel with each other in the voltage application direction, and respective application voltages of both regions are equal to each other. Therefore, a current more easily flows in the region with lower resistance. Thereby, the application efficiency of the voltage to the electrophoretic particle 32 is improved, and therefore, the electrophoretic particle 32 is easily moved in the insulating liquid 31.

A description has been given by focusing attention on the relation between the volume resistivity of the fibrous structure 331 and the volume resistivity of the insulating liquid 31 for the following reason. That is, since fine pores 34 are filled with the insulating liquid 31, as described above, magnitude relation between both volume resistivities affects behavior of the electrophoretic particle 32. Further, a description has been given by focusing attention on the relation between the volume resistivity of the dividing wall 35 and the volume resistivity of the insulating liquid 31 for the following reason. That is, since the dividing wall 35 is adjacent to the insulating liquid 31, as described above, magnitude relation between both volume resistivities affects the behavior of the electrophoretic particle 32. Further, a description has been given by focusing attention on the volume resistivity of the fibrous structure 331 and not on the volume resistivity of the non-electrophoretic particles 332 out of the porous layer 33 for the following reason. That is, the volume of the fibrous structure 331 occupies most of the entire volume of the porous layer 33. Thereby, to improve influence of the resistance characteristics of the porous layer 33 on the behavior of the electrophoretic particle 32, the volume resistivity of the fibrous structure 331 should be controlled practically.

The foregoing volume resistivity is electric characteristics measured by an impedance method with the use of dielectric measurement system (measured at certain intervals and at 10 deg C.). The dielectric measurement system is, for example, a 1260 type impedance analyzer including a 1296 type dielectric measurement interface made by Solartron, UK (Solartron SI 1260 impedance/grain-phase analyzer).

In the case where the electrophoretic device 30 includes an opposed layer arranged oppositely to the porous layer 33 with the insulating liquid 31 in between, the volume resistivity of the insulating liquid 31 is preferably larger than the volume resistivity of the opposed layer. Since the opposed layer is located between the pixel electrode 15 (or the opposed electrode 22) and the insulating liquid 31, the volume resistivity of the opposed layer affects application efficiency of a voltage to the insulating liquid 31. That is, in the case where the volume resistivity of the insulating liquid 31 is larger than the volume resistivity of the opposed layer, the application efficiency of the voltage to the insulating liquid 31 is more improved than in the case that the volume resistivity of the insulating liquid 31 is smaller than the volume resistivity of the opposed layer. In the case where component elements of the display unit are layered in the vertical direction (voltage application direction), a voltage drop is more largely generated in a location with high volume resistivity, and therefore, a voltage to be applied becomes higher. Thereby, since the application efficiency of the voltage to the electrophoretic particle 32 is more improved, the electrophoretic particle 32 is more easily moved in the insulating liquid 31.

A member of the opposed layer is not particularly limited, as long as the member exists between the pixel electrode 15 (or opposed electrode 22) and the insulating liquid 31. The opposed layer can be a member such as a film, or can be a film formed by various film forming methods or the like. Further, the opposed layer may be a single layer or may have a multilayer structure. A formation material of the opposed layer is able to be freely set according to the function, the role, and the like. The opposed layer may have a function as an adhesive layer, a sealing layer, or the like.

In this case, for example, as evidenced by FIG. 1, the opposed layer is part of the dividing wall unit 38, and the support base substance 37 to support the dividing wall 35. Therefore, the volume resistivity of the insulating liquid 31 is preferably larger than the volume resistivity of the support base substance 37. The support base substance 37 is arranged to surround the insulating liquid 31 together with the porous layer 33 and the dividing wall 35. However, in this case, the dividing wall 35 and the support base substance 37 composing the dividing wall unit 38 are preferably formed separately for the following reason. That is, in this case, the relation that the volume resistivity of the dividing wall 35 is larger than the volume resistivity of the insulating liquid 31 and the relation that the volume resistivity of the insulating liquid 31 is larger than the volume resistivity of the support base substance 37 are able to be concurrently established.

[Preferable Display Method of Electrophoretic Device]

In the electrophoretic device 30, as described above, contrast is generated by using the difference between the light reflectance of the electrophoretic particle 32 and the light reflectance of the porous layer 33 (the fibrous structure 331 containing the non-electrophoretic particle 332). In this case, it is possible that the light display is performed by the electrophoretic particle 32 and the dark display is performed by the porous layer 33, or vice versa. Such a difference in roles is determined by magnitude relation between the light reflectance of the electrophoretic particle 32 and the light reflectance of the porous layer 33. That is, the light reflectance of a component performing the light display is set to a higher value than the light reflectance of a component performing the dark display.

Specially, it is preferable that the dark display be performed by the electrophoretic particle 32 and the light display be performed by the porous layer 33. Accordingly, in the case where the light reflectance of the porous layer 33 is practically determined by the light reflectance of the non-electrophoretic particle 332, the light reflectance of the non-electrophoretic particle 332 is preferably higher than the light reflectance of the electrophoretic particle 32. The light reflectance for the light display in this case becomes remarkably increased by using diffuse reflection of the outside light by the porous layer 33, and therefore, contrast becomes remarkably increased accordingly.

[Spacer]

The spacer 40 is formed of, for example, an insulating material such as a polymer material. However, the configuration of the spacer 40 is not particularly limited, and can be composed of a sealing material in which fine particles are mixed, or the like.

The shape of the spacer 40 is not particularly limited. Specially, the shape of the spacer 40 is preferably a shape that does not prevent movement of the electrophoretic particle 32 and is able to uniformly distribute the electrophoretic particle 32. For example, the shape of the spacer 40 can be a lattice-like shape. Further, thickness of the spacer 40 is not particularly limited. Specially, the thickness of the spacer 40 is preferably small as much as possible in order to decrease power consumption, and is, for example, from 10 nm to 100 nm both inclusive. FIG. 1 illustrates a simplified configuration of the spacer 40.

[Operation of Display Unit]

Figure 4:
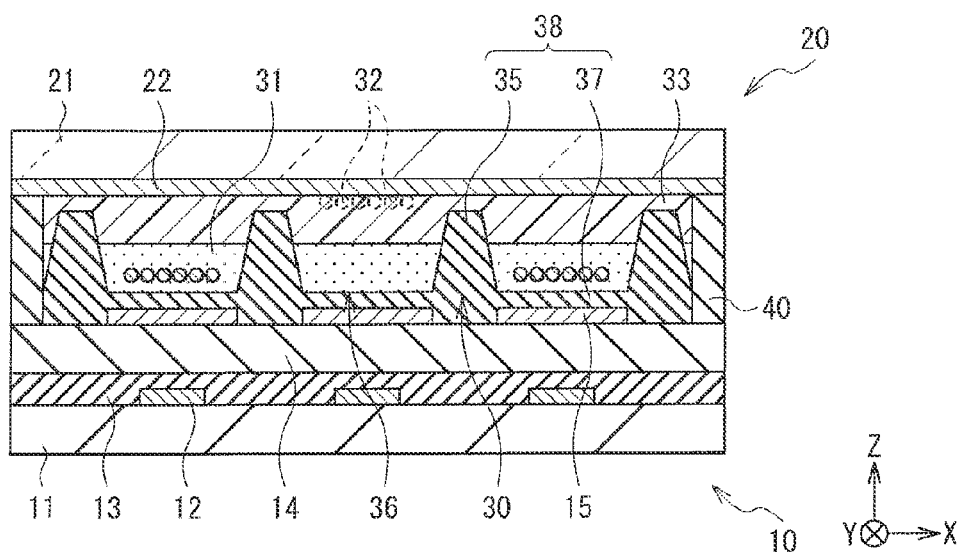
FIG. 4 is a cross-sectional view for explaining operation of the display unit.

The display unit is operated as below. FIG. 4 is intended to explain operation of the display unit, and illustrates a cross-sectional configuration corresponding to FIG. 1.

For example, a description will be given of a case that the dark display is performed by the electrophoretic particle 32 and the light display is performed by the porous layer 33 because the light reflectance of the electrophoretic particle 32 is smaller than the light reflectance of the porous layer 33 (the fibrous structure 331 and the non-electrophoretic particle 332).

In the initial state, as illustrated in FIG. 1, in all cells 36, the electrophoretic particles 32 are located on the side close to the pixel electrode 15 in the insulating liquid 31. In this case, if the display unit is viewed from the display surface side, the electrophoretic particles 32 are shielded by the porous layer 33 in all pixels (the light display is performed), and therefore, contrast is not generated (an image is not displayed).

In the case where a pixel is selected by the TFT 12 and an electric field is applied between the pixel electrode 15 and the counter electrode 22, as illustrated in FIG. 4, in the cell 36 to which the electric field is applied, the electrophoretic particles 32 are moved toward the counter electrode 22 thorough the fine pore 34 of the porous layer 33. In this case, if the display unit is viewed from the display surface side, pixels in which the electrophoretic particles 32 are shielded by the porous layer 33 (the light display is performed) and pixels in which the electrophoretic particles 32 are not shielded by the porous layer 33 (the dark display is performed) coexist, and therefore, contrast is generated by using a display color difference. As above, since the display color (light and dark display) is switched for every cell 36, an image is displayed by using contrast of the entire display surface.

[2. Method of Manufacturing Display Unit]

Figure 5:
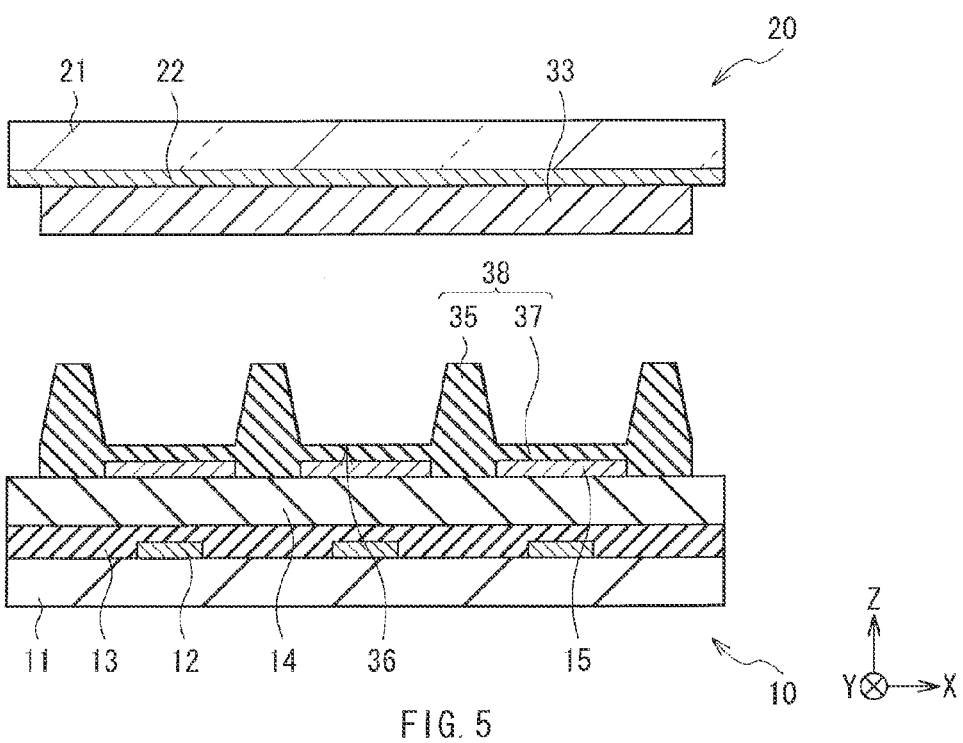
FIG. 5 is a cross-sectional view for explaining a method of manufacturing the display unit.
Figure 6:
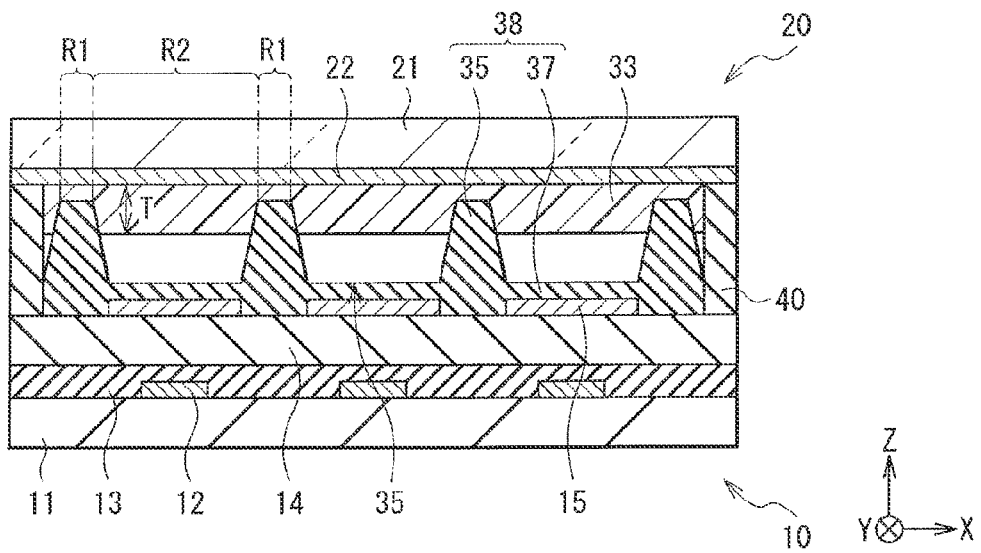
FIG. 6 is a cross-sectional view for explaining a step following a step in FIG. 5.

Next, a description will be given of a method of manufacturing a display unit. FIG. 5 and FIG. 6 are intended to explain the method of manufacturing a display unit, and illustrate cross-sectional configurations corresponding to FIG. 1.

First, as illustrated in FIG. 5, the TFT 12, the protective layer 13, the planarizing insulating layer 14, and the pixel electrode 15 are formed in this order over one surface of the support base substance 11 to form the drive substrate 10. Further, the counter electrode 22 is formed on one surface of the support base substance 21 to form the opposed substrate 20. As a method of forming the respective elements, for example, existing formation methods are able to be selected and used as needed.

Subsequently, the dividing wall unit 38 is formed on the pixel electrode 15 and the planarizing insulating layer 14 at the periphery thereof out of the opposed substrate 10. In this case, the dividing wall 35 and the support base substance 37 may be integrally formed by molding a resin with the use of, for example, the thermal imprint method or the like, or may be formed separately. A protective layer or the like may be formed between the planarizing insulating layer 14 and the pixel electrode 15, and the dividing wall unit 38 as needed.

Further, the porous layer 33 is formed to cover the counter electrode 22 out of the opposed substrate 20. In forming the porous layer 33, for example, a formation material of the fibrous structure 331 is dispersed in an organic solvent or the like to prepare a spinning solution. Subsequently, after the non-electrophoretic particle 332 is dispersed in the spinning solution, spinning is performed by the electrostatic spinning method. The spinning may be performed in the air or may be performed in reduced pressure atmosphere. Thereby, since the non-electrophoretic particle 332 is supported by the fibrous structure 331, the porous layer 33 is formed. In the formed porous layer 33, the area occupation ratio of the fine pore 34 is almost uniform in the entire porous layer 33.

Subsequently, as illustrated in FIG. 6, the drive substrate 10 and the opposed substrate 20 are oppositely arranged with the spacer 40 in between so that a space for filling the insulating liquid 31 (see FIG. 1) between the drive substrate 10 and the opposed substrate 20 is formed. In this case, the porous layer 33 is partially pressed by an end section of the dividing wall 35, and the area occupation ratio of the fine pore 34 is decreased in the pressed section (adjacent region R1) more than in the other section (non-adjacent region R2). Thereby, the thickness T of the porous layer 33 becomes smaller in the adjacent region R1 than in the non-adjacent region R2.

Finally, the space surrounded by the drive substrate 10, the opposed substrate 20, and the spacer 40 is filled with the insulating liquid 31 in which the electrophoretic particle 32 is dispersed. In this case, the electrophoretic particle 32 is arranged for every cell 36 sectioned by the dividing wall 35. Thereby, the display unit is completed.

In FIG. 6, the description has been given of the case that the porous layer 33 is pressed by the dividing wall 35. However, it is possible that the porous layer 33 is partially pressed by a member other than the dividing wall 35, and subsequently the dividing wall 35 is adjacent to the pressed section of the porous layer 33. In this case, the area occupation ratio of the fine pore 34 is locally decreased in the porous layer 33 of the adjacent region R1. However, to secure adhesion of the dividing wall 35 to the porous layer 33 and simplify manufacturing steps of the electrophoretic device 30, the porous layer 33 is preferably pressed by the dividing wall 35.

[Function and Effect of Display Unit]

According to the display unit using the electrophoretic device, the porous layer 33 is formed of the fibrous structure 331 containing the non-electrophoretic particle 332 having optical reflection characteristics different from those of the electrophoretic particle 32, and the dividing wall 35 is adjacent to the opposite surface of the porous layer 33 from the display surface. Further, the volume resistivity of the fibrous structure 331 is larger than the volume resistivity of the insulating liquid 31, and the volume resistivity of the dividing wall 35 is larger than the volume resistivity of the insulating liquid 31. Therefore, the following functions are obtained.

First, magnitude relations of volume resistivity among the fibrous structure 331, the insulating liquid 31, and the dividing wall 35 are made appropriate. Therefore, as described above, the application efficiency of the voltage to the electrophoretic particle 32 dispersed in the insulating liquid 31 is improved. Thereby, the electrophoretic particle 32 is easily moved through the insulating liquid 31, and therefore time necessary for moving the electrophoretic particle 32 is shortened, and energy necessary for moving the electrophoretic particle 32 is decreased. Further, since the electrophoretic particle 32 becomes less likely to be absorbed into the fibrous structure 331, the light reflectance of the porous layer 33 is less likely to be lowered.

Secondly, the porous layer 33 is formed from the fibrous structure 331 having the space structure complicated due to containing the non-electrophoretic particle 332. Therefore, while the sufficient number of fine pores 34 having sufficient size is included, the outside light is easily reflected diffusely even if the porous layer 33 is thin. Thereby, the light reflectance of the porous layer 33 is increased, and the electrophoretic particle 32 easily moves through the fine pore 34. Therefore, the time necessary for moving the electrophoretic particle 32 is more decreased, and the energy necessary for moving the electrophoretic particle 32 is more decreased.

Thirdly, the dividing wall 35 is adjacent to the opposite surface of the porous layer 33 from the display surface. Therefore, the dividing wall 35 is shielded by the porous layer 33 if being viewed from the display surface side. Thereby, contrast lowering caused by the existence of the dividing wall 35 is inhibited.

Accordingly, high contrast, high-speed response, and low power consumption are able to be realized. As a result, a high quality image is able to be displayed with low power consumption.

In particular, in the case where the opposed layer such as the support base substance 37 is arranged oppositely to the porous layer 33 with the insulating liquid 31 in between, and the volume resistivity of the insulating liquid 31 is larger than the volume resistivity of the opposed layer, the application efficiency of the voltage to the electrophoretic particle 32 is improved, and therefore, an similar effect is able to be obtained.

Further, in the case where the area occupation ratio of the fine pore 34 in the porous layer 33 is smaller in the adjacent region R1 than in the non-adjacent region R2, the electrophoretic particle 32 is less likely to be moved to an adjacent cell 36 through the porous layer 33 in the adjacent region R1. Therefore, image quality lowering such as display unevenness is able to be inhibited. In this case, in the case where the thickness T of the porous layer 33 is smaller in the adjacent region R1 than that in the non-adjacent region R2, the thickness of the entire electrophoretic device 30 is decreased, and therefore, the thickness of the display unit is able to be decreased even if the dividing wall 35 is provided. Further, in the case where the width W of the dividing wall 35 is decreased gradually toward the porous layer 33, the aperture area of the cell 36 is increased, and therefore, the image display area is able to be widened.

In addition, in the case where the fibrous structure 331 is formed by the electrostatic spinning method, or the fibrous structure 331 is a nanofiber having an average fiber diameter equal to or smaller than 10 nm, a space structure capable of more increasing diffuse reflection characteristics of the outside light is easily formed of the fibrous structure 331. Further, the size of the fine pore 34 is more increased, and the number thereof is more increased. Therefore, an higher effect is able to be obtained. In particular, since the light reflectance of the non-electrophoretic particles 332 is higher than the light reflectance of the electrophoretic particle 32, if the dark display is performed by the electrophoretic particle 32 and the light display is performed by the porous layer 33, the light reflectance of the porous layer 33 becomes remarkably increased by using the diffuse reflection of the outside light. Therefore, a still higher effect is obtained.

Further, in the case where the dividing wall 35 is used as a member for partially pressing the porous layer 33 in order to locally decrease the area occupation ratio of the fine pore 34, adhesion of the dividing wall 35 to the porous layer 33 is able to be secured, and the manufacturing steps of the electrophoretic device 30 are able to be simplified.

[3. Modifications]

Though the description has been given in FIG. 1 of the case that the opposed layer arranged oppositely to the porous layer 33 with the insulating liquid 31 in between is the support base substance 37, the opposed layer is not limited to the support base substance 37.

Figure 7:
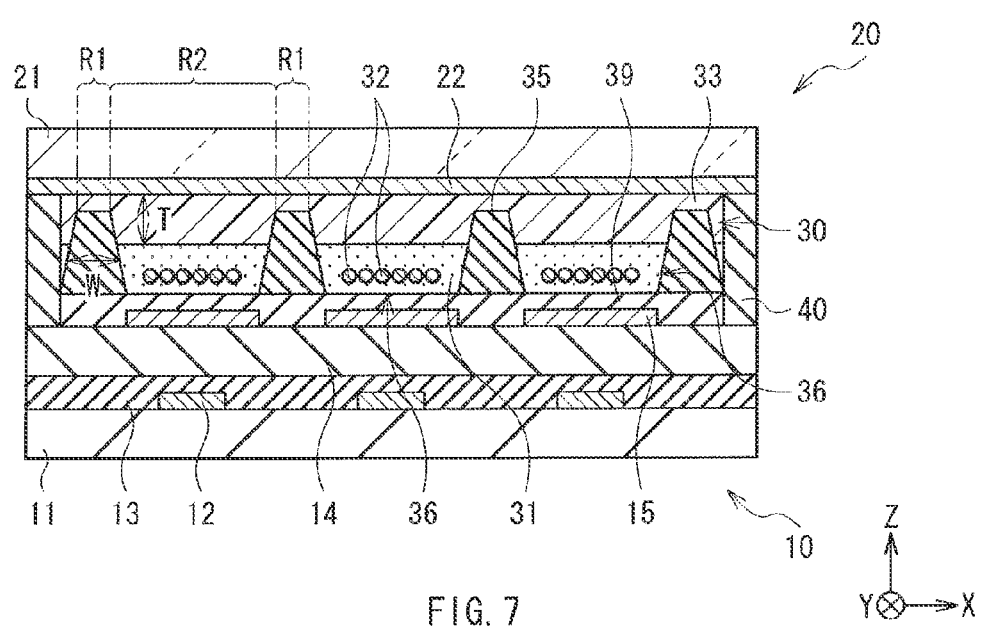
FIG. 7 is a cross-sectional view illustrating a modification of the configuration of the display unit.
Figure 8:
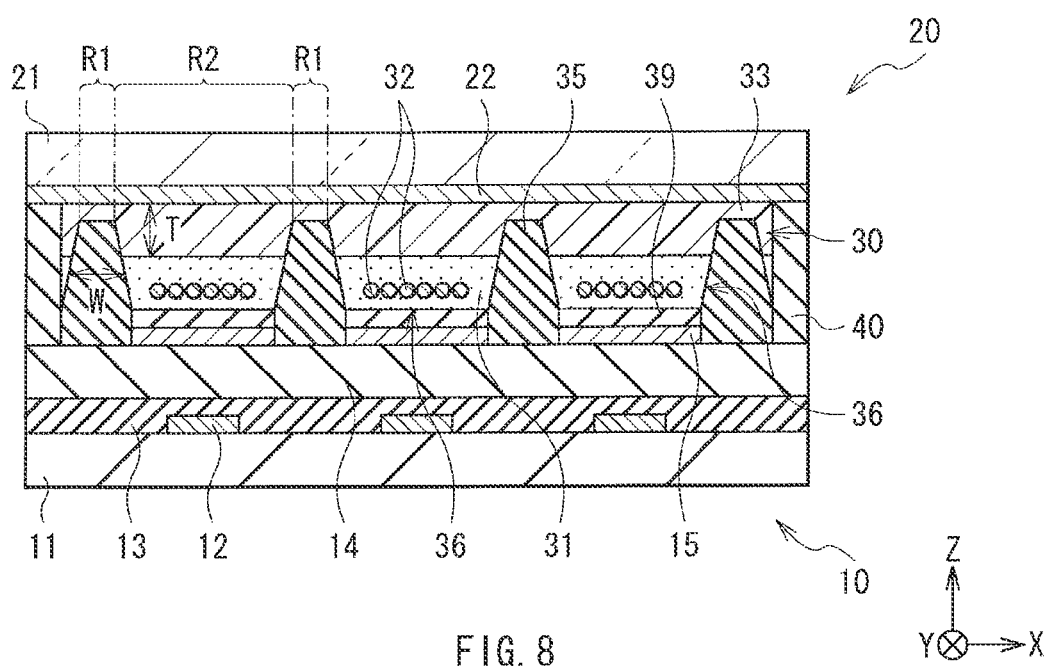
FIG. 8 is a cross-sectional view illustrating another modification of the configuration of the display unit.

For example, as illustrated in FIG. 7, various layers such as a protective layer 39 can be formed instead of the support base substance 37 as the opposed layer. The protective layer 39 is, for example, intended to protect the pixel electrode 15, and is formed separately from the dividing wall 35 with the use of an insulating material such as polyimide. However, the protective layer 39 can be formed from an adhesive, a tackiness agent, a UV cured resin, a thermoset resin, or the like. In this case, for example, as illustrated in FIG. 8, the protective layer 39 may be sectioned in parts so that the pixel electrode 15 is covered individually. In any case, by setting the volume resistivity of the insulating liquid 31 to a larger value than that of the volume resistivity of the protective layer 39, a similar effect is able to be obtained. It is needless to say that the opposed layer may be a layer other than the protective layer 39.

[4. Application Examples of Display Unit (Electronic Units)]

Next, a description will be given of application examples of the foregoing display unit.

The display unit of the present technology is able to be applied to electronic units for various purposes, and types of the electronic units are not particularly limited. For example, the display unit is able to be applied to the following electronic units. However, configurations of the electronic units hereinafter described are only examples, and the configurations thereof are able to be changed as appropriate.

Figure 9A:
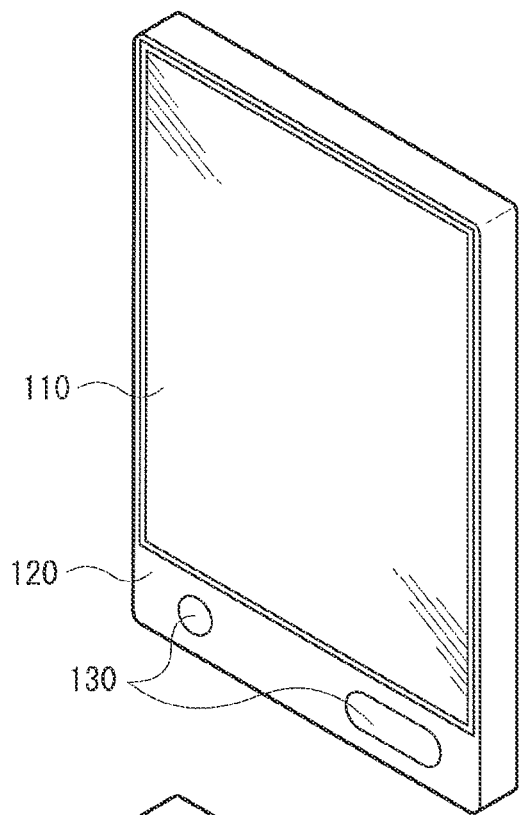
FIGS. 9A and 9B are perspective views illustrating a configuration of an electronic book using the display unit.
Figure 9B:
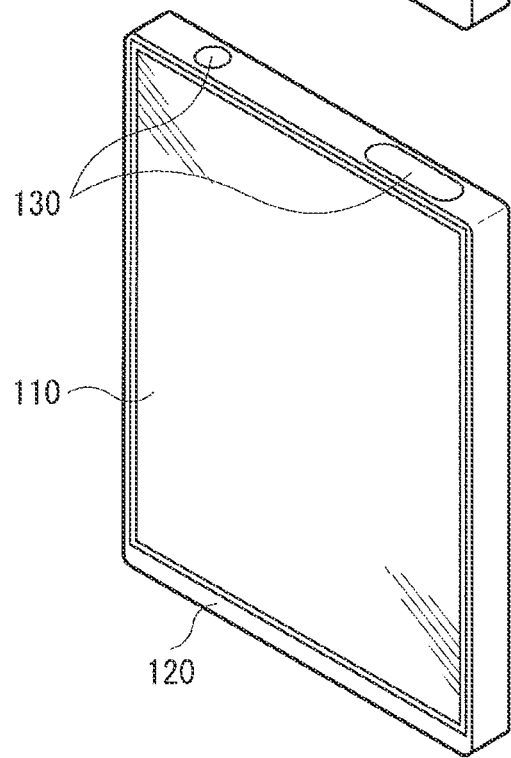

FIGS. 9A and 9B illustrate appearance configurations of an electronic book. The electronic book includes, for example, a display section 110, a non-display section (package) 120, and an operation section 130. The operation section 130 may be provided on the front surface of the non-display section 120 as illustrated in FIG. 9A, and may be provided on the top face as illustrated in FIG. 9B. The display unit may be mounted on a PDA or the like having a configuration similar to that of the electronic book illustrated in FIGS. 9A and 9B.

Figure 10:
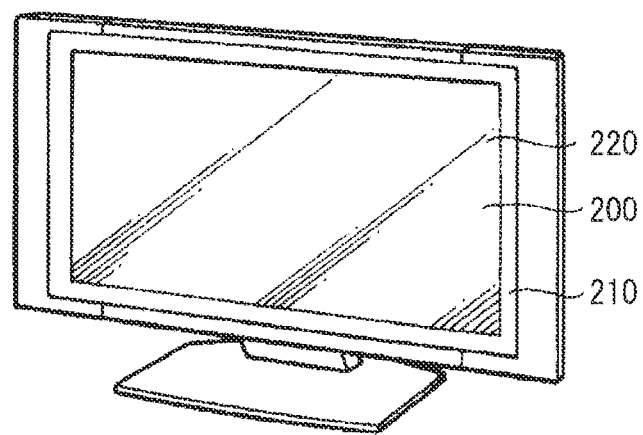
FIG. 10 is a perspective view illustrating a configuration of a television device using the display unit.

FIG. 10 illustrates an appearance configuration of a television unit. The television unit includes, for example, a video display screen section 200 including a front panel 210 and a filter glass 220.

Figure 11A:
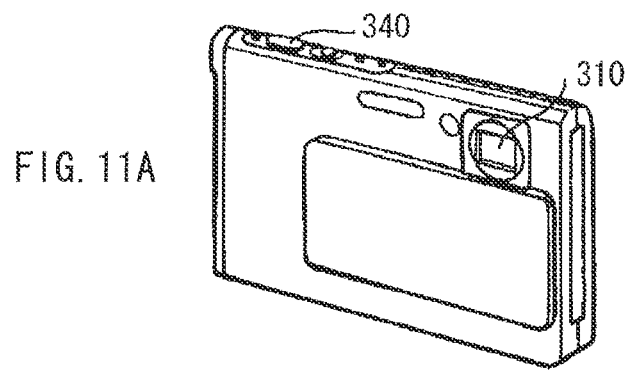
FIGS. 11A and 11B are perspective views illustrating a configuration of a digital still camera using the display unit.
Figure 11B:
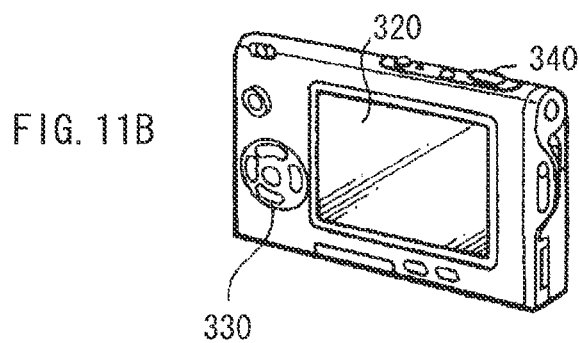

FIGS. 11A and 11B illustrate appearance configurations of a digital still camera, and FIGS. 11A and 11B respectively illustrate the front surface and the rear surface thereof. The digital still camera includes, for example, a light emitting section 310 for a flash, a display section 320, a menu switch 330, and a shutter button 340.

Figure 12:
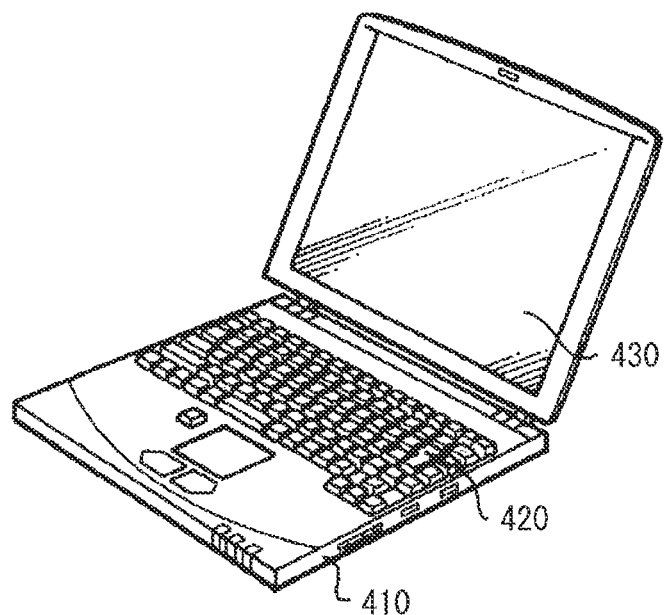
FIG. 12 is a perspective view illustrating an appearance of a personal computer using the display unit.

FIG. 12 illustrates an appearance configuration of a notebook personal computer. The notebook personal computer includes, for example, a main body 410, a keyboard 420 for operation of inputting characters and the like, and a display section 430 for displaying an image.

Figure 13:
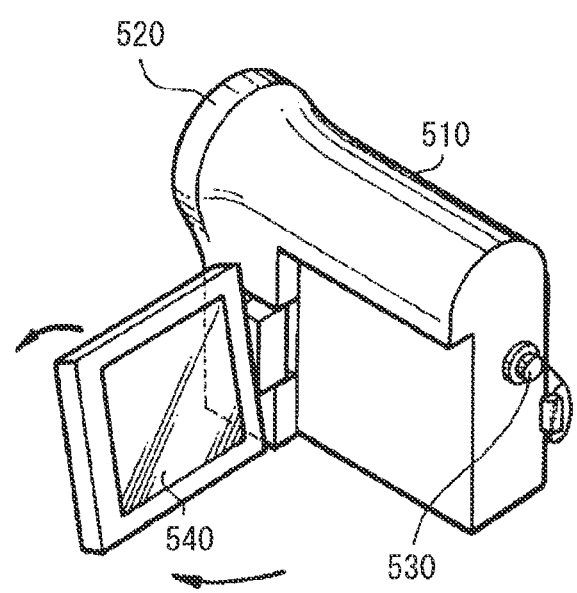
FIG. 13 is a perspective view illustrating an appearance of a video camcorder using the display unit.

FIG. 13 illustrates an appearance configuration of a video camcorder. The video camcorder includes, for example, a main body 510, a lens 520 for shooting an object provided on a front side face of the main body 510, a start/stop switch 530 in shooting, and a display section 540.

FIGS. 14A to 14G illustrate appearance configurations of a mobile phone.

FIGS. 14A and 14B respectively illustrate an elevation view and a side view in a state that the mobile phone is opened. FIGS. 14C to 14G respectively illustrate an elevation view, a left side view, a right side view, a top view, and a bottom view in a state that the mobile phone is closed. In the mobile phone, for example, an upper package 610 and a lower package 620 are jointed by a joint section (hinge section) 630. The mobile phone includes a display 640, a sub-display 650, a picture light 660, and a camera 670.

While the present technology has been described with reference to the embodiment, the present technology is not limited to the aspects described in the foregoing embodiment, and various modifications may be made. For example, application of the electrophoretic device of the present technology is not limited to the display unit, and the electrophoretic device of the present technology may be applied to other electronic units.

The present technology contains subject matter related to that disclosed in Japanese Priority Patent Application JP 2011-070356 filed in the Japanese Patent Office on Mar. 28, 2011, the entire contents of which is hereby incorporated by reference.

It should be understood by those skilled in the art that various modifications, combinations, sub-combinations, and alternations may occur depending on design requirements and other factors insofar as they are within the scope of the appended claims or the equivalents thereof.

What is claimed is:

1. An electrophoretic device comprising:
an electrophoretic particle;
a porous layer formed of a fibrous structure containing a non-electrophoretic particle having optical reflection characteristics different from those of the electrophoretic particle; and
a dividing wall adjacent to the porous layer,
wherein the electrophoretic particle, the porous layer, and the dividing wall are in an insulating liquid, and
volume resistivity of the fibrous structure is larger than volume resistivity of the insulating liquid, and volume resistivity of the dividing wall is larger than the volume resistivity of the insulating liquid.

2. The electrophoretic device according to claim 1 comprising:
an opposed layer arranged oppositely to the porous layer with the insulating liquid in between,
wherein the volume resistivity of the insulating liquid is larger than volume resistivity of the opposed layer.

3. The electrophoretic device according to claim 1, wherein the opposed layer is a support base substance that supports the dividing wall.

4. The electrophoretic device according to claim 1, wherein the porous layer has a plurality of fine pores, and
area ratio of the fine pores per unit area of the porous layer is smaller in an adjacent region where the dividing wall is adjacent to the porous layer than in a non-adjacent region where the dividing wall is not adjacent to the porous layer.

5. The electrophoretic device according to claim 4, wherein thickness of the porous layer is smaller in the adjacent region than in the non-adjacent region.

6. The electrophoretic device according to claim 1, wherein width of the dividing wall is decreased gradually toward the porous layer.

7. The electrophoretic device according to claim 1, wherein light reflectance of the non-electrophoretic particle is higher than light reflectance of the electrophoretic particle.

8. The electrophoretic device according to claim 1, wherein the fibrous structure is formed of at least one of a polymer material and an inorganic material, and the electrophoretic particle and the non-electrophoretic particle are formed of at least one of an organic pigment, an inorganic pigment, a dye, a carbon material, a metal material, a metal oxide, glass, and a polymer material.

9. The electrophoretic device according to claim 1, wherein the fibrous structure is formed by an electrostatic spinning method, and an average fiber diameter thereof is equal to or smaller than 10 μm.

10. The electrophoretic device according to claim 1, wherein the non-electrophoretic particle is partly exposed from the fibrous structure.

11. The electrophoretic device according to claim 1, wherein the non-electrophoretic particle is partly buried inside the fibrous structure.

12. A display unit comprising:

an electrophoretic device between a pair of base substances, at least one of which has light transmission characteristics, wherein the electrophoretic device includes an electrophoretic particle, a porous layer formed of a fibrous structure containing a non-electrophoretic particle having optical reflection characteristics different from those of the electrophoretic particle, and a dividing wall adjacent to an opposite surface of the porous layer from a display surface, wherein the electrophoretic particle, the porous layer, and the dividing wall are in an insulating liquid, and volume resistivity of the fibrous structure is larger than volume resistivity of the insulating liquid, and volume resistivity of the dividing wall is larger than the volume resistivity of the insulating liquid.

13. An electronic unit comprising:

a display unit having an electrophoretic device between a pair of base substances, at least one of which has light transmission characteristics, wherein the electrophoretic device includes an electrophoretic particle, a porous layer formed of a fibrous structure containing a non-electrophoretic particle having optical reflection characteristics different from those of the electrophoretic particle, and a dividing wall adjacent to an opposite surface of the porous layer from a display surface, wherein the electrophoretic particle, the porous layer, and the dividing wall are in an insulating liquid, and volume resistivity of the fibrous structure is larger than volume resistivity of the insulating liquid, and volume resistivity of the dividing wall is larger than the volume resistivity of the insulating liquid.

* * * * *